United States Patent
Wu et al.

(10) Patent No.: US 8,828,640 B2
(45) Date of Patent: Sep. 9, 2014

(54) PHOTO-CURING POLYSILOXANE COMPOSITION AND APPLICATION THEREOF

(71) Applicant: Chi Mei Corporation, Tainan (TW)

(72) Inventors: Ming-Ju Wu, Tainan (TW); Chun-An Shih, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 13/671,016

(22) Filed: Nov. 7, 2012

(65) Prior Publication Data

US 2013/0144005 A1    Jun. 6, 2013

(30) Foreign Application Priority Data

Dec. 1, 2011   (TW) .............................. 100144161 A

(51) Int. Cl.

| | |
|---|---|
| G03C 1/52 | (2006.01) |
| C08L 83/06 | (2006.01) |
| C08K 5/00 | (2006.01) |
| C08L 83/04 | (2006.01) |
| C09D 183/04 | (2006.01) |
| C09D 183/06 | (2006.01) |

(52) U.S. Cl.
CPC ............... *C08L 83/06* (2013.01); *C08K 5/0025* (2013.01); *C08L 83/04* (2013.01); *C09D 183/04* (2013.01); *C09D 183/06* (2013.01)
USPC ........ 430/192; 430/189; 430/270.1; 430/326; 528/41

(58) Field of Classification Search
None
See application file for complete search history.

(56) References Cited

U.S. PATENT DOCUMENTS 7,598,009 B2 * 10/2009 Sato et al. ....................... 430/18

FOREIGN PATENT DOCUMENTS

| JP | 2008-083124 | * | 4/2008 |
|---|---|---|---|
| JP | 2008-083124 A | | 4/2008 |
| JP | 2008-107529 | * | 5/2008 |
| JP | 2008-107529 A | | 5/2008 |

OTHER PUBLICATIONS

Abstract for JP 2006-276598 (Oct. 2012).*
Machine generated translation of JP 2006-276598 into English.*
Machine translation of JP 2008-107529 into English.*
Machine translation of JP JP 2008-083124 into English.*

* cited by examiner

*Primary Examiner* — Marc Zimmer
(74) *Attorney, Agent, or Firm* — Fox Rothschild LLP; Robert J. Sacco

(57) ABSTRACT

This invention relates to a photo-curing polysiloxane composition including a polysiloxane, a quinonediazidesulfonic acid ester, a methylene alkoxyaryl-containing compound as a curing agent, and a solvent for dispersing the polysiloxane, the quinonediazidesulfonic acid ester, and the methylene alkoxyaryl-containing compound. This invention also provides a protecting film made from the photo-curing polysiloxane composition, and an element containing the protecting film.

7 Claims, No Drawings

PHOTO-CURING POLYSILOXANE COMPOSITION AND APPLICATION THEREOF

CROSS-REFERENCE TO RELATED APPLICATION

This application claims priority of Taiwanese Application No. 100144161, filed on Dec. 1, 2011.

BACKGROUND OF THE INVENTION

1. Field of the Invention

This invention relates to a photo-curing polysiloxane composition, more particularly to a photo-curing polysiloxane composition for forming a planarizing film for a substrate of a liquid crystal display (LCD), an organic electroluminescence display, and the like, an interlayer insulating film, or a core or a cladding of an optical waveguide as a protective film. This invention also relates to a protective film formed from the photo-curing polysiloxane composition and to an element containing the protective film.

2. Description of the Related Art

In recent years, in the field of integrated circuits used in the semiconductor industry, liquid crystal displays, and organic electroluminescence displays, it is required that the pattern details in photolithography process be higher due to element miniaturization.

Positive type photosensitive materials with high resolution and high sensitivity are adopted to obtain miniaturized patterns via exposure and development. The positive type photosensitive material containing a polysiloxane composition has been widely used in the art.

JP 2008-107529 discloses a photosensitive resin composition capable of forming a cured film with high transparency. The photosensitive resin composition includes polysiloxane containing an oxetanyl group or a succinic anhydride group. A hydrophilic structure is obtained after a ring-opening reaction during copolymerization. However, sensitivity of the photosensitive resin composition is still insufficient for application in the art, and there is a problem of slow curing rate, even though high solubility can be obtained using a dilute base developer solution.

JP 2008-083124 discloses a positive photosensitive resin composition with good sensitivity stability, and high adhesive property and chemical resistivity. The positive photosensitive resin composition includes a polyimide-based polymer represented by formula (1) defined therein, a quinonediazide compound, an alkoxymethyl group-containing compound, an aminosilane compound, and a solvent.

It still required in the art to provide a photosensitive resin composition with high sensitivity and fast curing rate.

SUMMARY OF THE INVENTION

A first object of this invention is to provide a photo-curing polysiloxane composition having high sensitivity and fast curing rate.

A second object of this invention is to provide a planarizing film for a substrate of a liquid crystal display (LCD), an organic electroluminescence display, and the like, an interlayer insulating film, or a core or a cladding of an optical waveguide as a protective film.

A third object of this invention is to provide an element including the protective film.

According to a first aspect of this invention, there is provided a photo-curing polysiloxane composition including a polysiloxane (A), a quinonediazidesulfonic acid ester (B), a methylene alkoxyaryl-containing compound (C) as a curing agent, and a solvent (D). The methylene alkoxyaryl-containing compound (C) is selected from the group consisting of a compound of Formula (I):

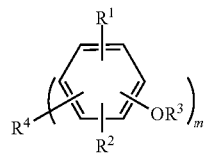

wherein m is an integer ranging from 1 to 4, $R^1$ and $R^2$ are independently selected from the group consisting of a $C_1$-$C_6$ alkyl group and a group of —$CH_2$—O—X with the proviso that at least one of $R^1$ and $R^2$ is the group of —$CH_2$—O—X, wherein X represents a $C_1$-$C_6$ alkyl group, $R^3$ is selected from the group consisting of hydrogen, methyl, and ethyl, $R^4$ is selected from the group consisting of a single bond and a group having m valence with the proviso that $R^4$ is selected from the group consisting of a $C_1$-$C_6$ alkyl group, a $C_6$-$C_{12}$ cycloalkyl group, and hydrogen when m is 1, $R^4$ is a bivalent group selected from the group consisting of phenylene, —$SO_2$—,

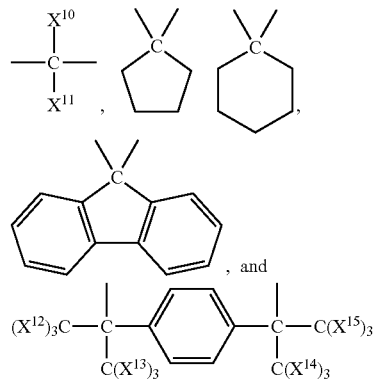

, and when m is 2, $R^4$ is a trivalent group selected from the group consisting of

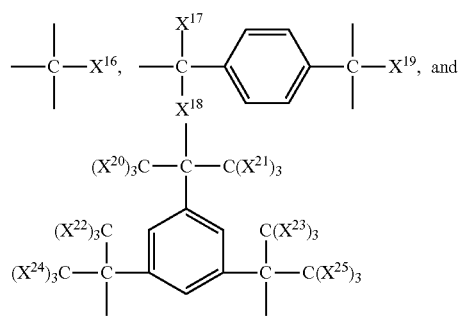

when m is 3, and $R^4$ is a tetravalent group selected from the group consisting of

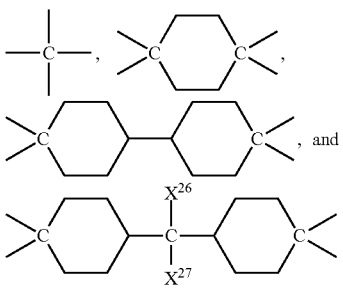

when m is 4,
wherein $X^{10}$-$X^{27}$ are independently selected from the group consisting of hydrogen, halogen, and a $C_1$-$C_{20}$ organic group,
a compound of formula (II):

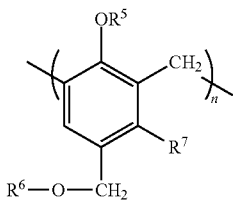

(II)

wherein
n is an integer ranging from 10 to 35,
$R^5$ and $R^7$ are independently selected from the group consisting of hydrogen, methyl, and ethyl, and
$R^6$ represents a $C^1$-$C^6$ alkyl group,
and a combination thereof.

According to a second aspect of this invention, there is provided a protective film formed on a substrate. The protective film is formed by applying the photo-curing polysiloxane composition on the substrate, followed by pre-bake, exposure, development, and post-bake.

According to a third aspect of this invention, there is provided an element including the protective film applied on the substrate.

DETAILED DESCRIPTION OF THE PREFERRED EMBODIMENTS

A photo-curing polysiloxane composition according to this invention includes a polysiloxane (A), a quinonediazidesulfonic acid ester (B), a methylene alkoxyaryl-containing compound (C) as a curing agent, and a solvent (D).

The following is a detailed description of the polysiloxane (A), the quinonediazidesulfonic acid ester (B), the methylene alkoxyaryl-containing compound (C), and the solvent (D).

Polysiloxane (A):

There is no specific limitation to the structure of polysiloxane (A). Preferably, the polysiloxane (A) is obtained by subjecting a silane monomer, a siloxane prepolymer, or a combination of a silane monomer and a siloxane prepolymer to hydrolysis and partial condensation.

Preferably, the silane monomer is represented by Formula (III):

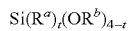

(III)

wherein
t denotes an integer ranging from 0 to 3;

$R^a$ represents a hydrogen atom, a $C_1$-$C_{10}$ alkyl group, a $C_2$-$C_{10}$ alkenyl group, a $C_6$-$C_{15}$ aryl group, an anhydride-substituted alkyl group, an oxetanyl-substituted alkyl, an oxetanyl-substituted alkoxy group, a glycidyl-substituted alkyl group, or a glycidyl-substituted alkoxy group, and the plural $R^a$s can be identical with or different from each other when t is 2 or 3; and $R^b$ represents a hydrogen atom, a $C_1$-$C_6$ alkyl group, a $C_1$-$C_6$ acyl group, or a $C_6$-$C_{15}$ aryl group, and the plural $R^b$s can be identical with or different from each other when 4-t is 2 or 3.

Any of the alkyl, acyl, and aryl groups can be optionally substituted.

In the definition of $R^a$, examples of the alkyl group include, but are not limited to, methyl, ethyl, n-propyl, isopropyl, n-butyl, tert-butyl, n-hexyl, n-decyl, trifluoromethyl, 3,3,3-trifluoropropyl, 3-aminopropyl, 3-mercaptopropyl, and 3-isocyanatopropyl. Examples of the alkenyl group include, but are not limited to, vinyl, 3-acryloxypropyl, and 3-methacryloxypropyl. Examples of the aryl group include, but are not limited to, phenyl, tolyl, p-hydroxyphenyl, 1-(p-hydroxyphenyl)ethyl, 2-(p-hydroxyphenyl)ethyl, 4-hydroxy-5-(p-hydroxyphenylcarbonyloxy)pentyl, and naphthyl. Examples of the anhydride-substituted alkyl group include, but are not limited to, 3-glutaric anhydride propyl, 3-succinic anhydride propyl, and 2-succinic anhydride ethyl. A non-limiting example of the oxetanylsubstituted alkyl group is oxetanylpentyl. A non-limiting example of the oxetanyl-substituted alkoxy group is 2-oxetanylbutoxy. A non-limiting example of the glycidyl-substituted alkyl group is 2-(3,4-epoxycyclohexyl)ethyl. A non-limiting example of the glycidyl-substituted alkoxy group is glycidoxypropyl.

In the definition of $R^b$, examples of the alkyl group include, but are not limited to, methyl, ethyl, n-propyl, isopropyl, and n-butyl. A non-limiting example of the acyl group is acetyl. A non-limiting example of the aryl group is phenyl.

When t is 0, the silane monomer represents a tetrafunctional silane. When t is 1, the silane monomer represents a trifunctional silane. When t is 2, the silane monomer representes a difunctional silane. When t is 3, the silane monomer represents a monofunctional silane.

Examples of the silane monomer include, but are not limited to, (1) tetrafunctional silanes: tetramethoxysilane, tetraethoxysilane, tetraacetoxysilane, tetraphenoxysilane, or the like; (2) trifunctional silanes: methyltrimethoxysilane (MTMS), methyltriethoxysilane, methyltriisopropoxysilane, methyltri-n-butoxysilane, ethyltrimethoxysilane, ethyltriethoxysilane, ethyltriisopropoxysilane, ethyltri-n-butoxysilane, n-propyltrimethoxysilane, n-propyltriethoxysilane, n-butyltrimethoxysilane, n-butyltriethoxysilane, n-hexyltrimethoxysilane, n-hexyltriethoxysilane, decyltrimethoxysilane, vinyltrimethoxysilane, vinyltriethoxysilane, 3-acryloxypropyltrimethoxysilane, 3-methylacryloxypropyltrimethoxysilane, 3-methylacryloxypropyltriethoxysilane, phenyltrimethoxysilane (PTMS), phenyltriethoxysilane (PTES,) p-hydroxyphenyltrimethoxysilane, 1-(p-hydroxyphenyl)ethyltrimethoxysilane, 2-(p-hydroxyphenyl)ethyltrimethoxysilane, 4-hydroxy-5-(p-hydroxyphenylcarbonyloxy) pentyltrimethoxysilane, trifluoromethyltrimethoxysilane, trifluoromethyltriethoxysilane, 3,3,3-trifluoropropyltrimethoxysilane, 3-aminopropyltrimethoxysilane, 3-aminopropyltriethoxysilane, 3-glycidoxypropyltrimethoxysilane, 3-glycidoxypropyltriethoxysilane, 2-(3,4-epoxycyclohexyl) ethyltrimethoxysilane, 3-mercaptopropyltrimethoxysilane, 3-ethyl-3-[[3-(triphenoxysilyl)propoxy)ethyl]oxetane; commercially available products manufactured by Toagosei Co., Ltd., for example, 3-ethyl-3-[[3-(trimethoxysilyl)propoxy) methyl]oxetane (trade name: TMSOX-D), 3-ethyl-3 -[[3(triethoxysilyl)propoxy)methyl]oxetane (trade name: TESOX-D), 2-(trimethoxysilyl)ethyl succinic anhydride, 3-triphenoxysilyl propyl succinic anhydride, or the like; commercially available products manufactured by Shin-Etsu Chemical Co., Ltd., for example, 3-trimethoxysilyl propyl succinic anhydride (trade name: X-12-967), or the like; commercially available products manufactured by Wacker Chemie AG, for example, 3-(triethoxysilyl)propyl succinic anhydride (trade name: GF-20), 3-(triethoxysilyl)propyl glutaric anhydride (trade name: TMSG), 3-(triethoxysilyl) propyl glutaric anhydride, 3-(triphenoxysilyl)propyl glutaric anhydride, or the like; (3) difunctional silanes: dimethyldimethoxysilane (DMDMS), dimethyldiethoxysilane, dimethyldiacetyloxysilane, di-n-butyldimethoxysilane, diphenyldimethoxysilane, diisopropoxy-di(2-oxetanylpropylbutoxypropyl)silane (DIDOS), di(3-oxetanylpentyl)dimethoxysilane, di-n-butoxysilyl)di(propyl succinic anhydride (dimethoxysilyl)di(ethyl succinic anhydride); (4) monofunctional silanes: trimethylmethoxysilane, tri-n-butylethoxysilane, 3-glycidoxydimethylmethoxysilane, 3-glycidoxydimethylethoxysilane, di(2-oxetanylbutoxypentyl)-2-oxetanylpentylethoxy silane, tri(2-oxetanylpentyl)methoxysilane, (phenoxysilyl)tri(propyl succinic anhydride), (methoxysilyl)di(ethyl succinic anhydride), or the like. The aforesaid examples of the silane monomer can be used alone or as a mixture of two or more.

In this invention, the siloxane prepolymer is preferably represented by Formula (TV):

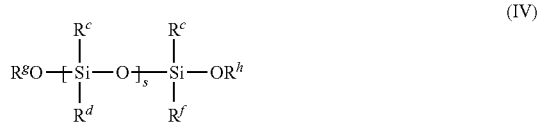

wherein $R^c$, $R^d$, $R^e$ and $R^f$ represent, respectively and independently, a hydrogen atom, a substituted or unsubstituted $C_1$-$C_{10}$ alkyl group, a substituted or unsubstituted $C_2$-$C_6$ alkenyl group, or a substituted or unsubstituted $C_6$-$C_{15}$ aryl group. The plural $R^c$s and $R^d$s can be respectively identical with or different from each other when s is from 2 to 1,000. Examples of the alkyl group include, but are not limited to, methyl, ethyl, and n-propyl. Examples of the alkenyl group include, but are not limited to, vinyl, acryloxypropyl, and methacryloxypropyl. Examples of the aryl group include, but are not limited to, phenyl, tolyl, and naphthyl.

$R^g$ and $R^h$ represent, respectively and independently, a hydrogen atom, a substituted or unsubstituted $C_1$-$C_6$ alkyl group, a substituted or unsubstituted $C_1$-$C_6$ acyl group, or a substituted or unsubstituted $C_6$-$C_{15}$ aryl group. Examples of the alkyl group include, but are not limited to, methyl, ethyl, n-propyl, isopropyl, and n-butyl. A non-limiting example of the acyl group is acetyl. A non-limiting example the aryl group is phenyl.

In Formula (IV), s is an integer ranging from 1 to 1000, preferably from 3 to 300, and more preferably from 5 to 200.

Examples of the siloxane prepolymer include, but are not limited to, 1,1,3,3-tetramethyl-1,3-dimethoxy disiloxane, 1,1,3,3-tetramethyl-1,3-diethoxydisiloxane, 1,1,3,3-tetraethyl-1,3-diethoxydisiloxane, and commercially available silanol terminal polysiloxanes manufactured by Gelest Inc. (for example, DM-S12 (molecular weight: 400-700), DMS-S15 (molecular weight: 1,500-2,000), DMS-S21 (molecular weight: 4,200), DMS-S27 (molecular weight: 18,000), DMS-S31 (molecular weight:26,000), DMS-S32 (molecular weight: 36,000), DMS-S33 (molecular weight: 43,500), DMS-S35 (molecular weight: 49,000), DMS-S38 (molecular weight: 58,000), DMS-S42 (molecular weight: 77,000), PDS-9931 (molecular weight: 1,000-1,400), or the like), or the like. The aforesaid examples of the siloxane prepolymer can be used alone or as a mixture of two or more.

When the silane monomer and the siloxane prepolymer are used in combination, there is no specific limitation to the mixing ratio thereof. Preferably, the molar ratio of the silane monomer and the siloxane prepolymer in Si atom ranges from 100:0.01 to 50:50.

Alternatively, the polysiloxane (A) can be prepared via copolymerization by mixing the silane monomer and/or the siloxane prepolymer with silicon dioxide particles. There is no specific limitation to the mean particle size of the silicon dioxide particles. The mean particle size of the silicon dioxide particles ranges generally from 2 nm to 250 nm, preferably from 5 nm to 200 nm, and more preferably from 10 nm to 100 nm.

Examples of the silicon dioxide particles include commercially available products manufactured by JGC Catalysts and Chemicals Ltd., for example, OSCAR 1132 (particle size: 12 nm, dispersant: methanol), OSCAR 1332 (particle size: 12 nm, dispersant: n-propanol), OSCAR 105 (particle size: 60 nm, dispersant: γ-butyrolactone), OSCAR 106 (particle size: 120 nm, dispersant: diacetone alcohol), or the like; commercially available products manufactured by Fuso Chemical Co., Ltd., for example, Quartron PL-1-IPA (particle size: 13 nm, dispersant: isopropanone), Quartron PL-1-TOL (particle size: 13 nm, dispersant: toluene), Quartron PL-2L-PGME (particle size: 18 nm, dispersant: propylene glycol monomethyl ether), Quartron PL-2L-MEK (particle size: 18 nm, dispersant: methyl ethyl ketone), or the like; and commercially available products manufactured by Nissan Chemical, for example, IPA-ST (particle size: 12 nm, dispersant: isopropanol), EG-ST (particle size: 12 nm, dispersant: ethylene glycol), IPA-ST-L (particle size: 45 nm, dispersant: isopropanol), IPA-ST-ZL (particle size: 100 nm, dispersant: isopropanol), or the like. The aforesaid examples of the silicon dioxide particles can be used alone or as a mixture of two or more.

There is no specific limitation to the amounts when mixing the silicon dioxide particles with the silane monomer and/or the siloxane prepolymer. Preferably, the molar ratio of the silicon dioxide particles to the polysiloxane in Si atom ranges from 1% to 50%.

The hydrolysis and the partial condensation can be conducted in a manner well known in the art. For example, a solvent, water, and optionally a catalyst are added to the mixture of the silane monomer and/or the siloxane prepolymer with the silicon dioxide particles, followed by stirring at a temperature ranging from 50° C. to 150° C. for 0.5 to 120 hours. During stirring, the by-products, such as alcohols and water, can be removed by distillation, if necessary.

There is no specific limitation to the solvent, which can be identical with or different from the solvent (D) contained in the photo-curing polysiloxane composition. Preferably, the solvent is used in an amount ranging generally from 15 g to 1200 g, preferably from 20 to 1100 g, and more preferably from 30 g to 1000 g, based on 100 g of the silane monomer and/or the siloxane prepolymer.

The amount of water for the hydrolysis ranges from 0.5 to 2 moles based on 1 mole of the hydrolyzable groups contained in the mixture.

There is no specific limitation to the catalyst, and an acid catalyst or a base catalyst can be used. Examples of the acid catalyst include hydrochloric acid, nitric acid, sulfuric acid, hydrofluoric acid, oxalic acid, phosphoric acid, acetic acid, trifluoroacetic acid, formic acid, polycarboxylic acids and anhydrides thereof, ion exchange resins, or the like. Examples of the base catalyst include diethylamine, triethylamine, tripropylamine, tributylamine, tripentylamine, trihexylamine, triheptylamine, trioctylamine, diethanolamine, triethanolamine, sodium hydroxide, potassium hydroxide, alkoxysilanes containing an amino group, ion exchange resins, or the like.

Preferably, the catalyst is used in an amount ranging generally from 0.005 g to 15 g, preferably from 0.01 g to 12 g, and more preferably from 0.05 g to 10 g, based on 100 g of the silane monomer and/or the siloxane prepolymer.

In view of the storage stability, it is preferable that the by-products (for example, alcohols or water) and the catalyst are not contained in polysiloxane produced after hydrolysis and partial condensation. Therefore, it is preferable to purify polysiloxane. There is no specific limitation to the purification method. Preferably, polysiloxane is diluted with a hydrophobic solvent, and an organic layer washed with water several times is then concentrated with an evaporator to remove alcohols and water. Additionally, the catalyst can be removed using ion exchange resin.

Quinonediazidesulfonic Acid Ester (B):

There no specific limitation to the quinonediazidesulfonic acid ester (B) suitable in the photo-curing polysiloxane composition of the present invention. The quinonediazidesulfonic acid ester (B) can be a fully or partially esterified compound. Preferably, the quinonediazidesulfonic acid ester (B) is obtained via a reaction of o-naphthoquinonediazidesulfonic acid or salt thereof with a hydroxyl compound. More preferably, the quinonediazidesulfonic acid ester (B) is obtained via a reaction of o-naphthoquinonediazidesulfonic acid or salt thereof with a polyhydroxyl compound.

Examples of the o-naphthoquinonediazidesulfonic acid include, but are not limited to, o-naphthoquinonediazide-4-sulfonic acid, o-naphthoquinonediazide-5-sulfonic acid, and o-naphthoquinonediazide-6-sulfonic acid. A non-limiting example of the salt of o-naphthoquinonediazidesulfonic acid is halide of o-naphthoquinonediazidesulfonic acid.

Examples of the hydroxyl compound include, but are not limited to:

(1) hydroxybenzophenone compounds, for example, but not limited to, 2,3,4-trihydroxybenzophenone, 2,4,4'-trihydroxybenzophenone, 2,4,6-trihydroxybenzophenone, 2,3,4,4'-tetrahydroxybenzophenone, 2,4,2',4'-tetrahydroxybenzophenone, 2,4,6,3',4'-pentahydroxybenzophenone, 2,3,4,2',4'-pentahydroxybenzophenone, 2,3,4,2',5'-pentahydroxybenzophenone, 2,3,5,3',5'-pentahydroxybenzophenone, and 2,3,4,3',4',5'-hexahydroxybenzophenone.

(2) hydroxyaryl compounds, for example, but not limited to, a hydroxyaryl compound represented by Formula (V):

$$(V)$$

wherein $R^i$, $R^j$, and $R^k$ represent, respectively and independently, a hydrogen atom or a $C_1$-$C_6$ alkyl group;

$R^l$, $R^m$, $R^n$, $R^o$, $R^p$, and $R^q$ represent, respectively and independently, a hydrogen atom, a halogen atom, a $C_1$-$C_6$ alkyl group, a $C_1$-$C_6$ alkoxy group, a $C_1$-$C_6$ alkenyl group, or a cycloalkyl group;

$R^r$ and $R^w$ represent, respectively and independently, a hydrogen atom, a halogen atom, or a $C_1$-$C_6$ alkyl group;

x, y, and z denote, respectively and independently, an integer ranging from 1 to 3; and k denotes 0 or 1.

Examples of the hydroxyaryl compound represented by Formula (V) include, but are not limited to, tri(4-hydroxyphenyl)methane, bis(4-hydroxy-3,5-dimethylphenyl)-4-hydroxyphenylmethane, bis(4-hydroxy-3,5-dimethylphenyl)-3-hydroxyphenylmethane, bis(4-hydroxy-3,5-dimethylphenyl)-2-hydroxyphenylmethane, bis(4-hydroxy-2,5-dimethylphenyl)-4-hydroxyphenylmethane, bis(4-hydroxy-2,5-dimethylphenyl)-3-hydroxyphenylmethane, bis(4-hydroxy-2,5-dimethylphenyl)-2-hydroxyphenylmethane, bis(4-hydroxy-3,5-dimethylphenyl)-3,4-dihydroxyphenylmethane, bis(4-hydroxy-2,5-dimethylphenyl)-3,4-dihydroxyphenylmethane, bis(4-hydroxy-3,5-dimethylphenyl)-2,4-dihydroxyphenylmethane, bis(4-hydroxy-2,5-dimethylphenyl)-2,4-dihydroxyphenylmethane, bis(4-hydroxyphenyl)-3-methoxy-4-hydroxyphenylmethane, bis(3-cyclohexyl-4-hydroxyphenyl)-3-hydroxyphenylmethane, bis(3-cyclohexyl-4-hydroxyphenyl)-2-hydroxyphenylmethane, bis(3-cyclohexyl-4-hydroxyphenyl)-4-hydroxyphenylmethane, bis(3-cyclohexyl-4-hydroxy-6-methylphenyl)-2-hydroxyphenylmethane, bis(3-cyclohexyl-4-hydroxy-6-methylphenyl)-3-hydroxyphenylmethane, bis(3-cyclohexyl-4-hydroxy-6-methylphenyl)-4-hydroxyphenylmethane, bis(3-cyclohexyl-4-hydroxy-6-methylphenyl)-3,4-dihydroxyphenylmethane, bis(3-cyclohexyl-6-hydroxyphenyl)-3-hydroxyphenylmethane, bis(3-cyclohexyl-6-hydroxyphenyl)-4-hydroxyphenylmethane, bis(3-cyclohexyl-6-hydroxyphenyl)-2-hydroxyphenylmethane, bis(3-cyclohexyl-6-hydroxy-4-methylphenyl)-2-hydroxyphenylmethane, bis(3-cyclohexyl-6-hydroxy-4-methylphenyl)-4-hydroxyphenylmethane, bis(3-cyclohexyl-6-hydroxy-4-methylphenyl)-3,4-dihydroxyphenylmethane, 1-[1-(4-hydroxyphenyl)isopropyl]-4-[1,1-bis(4-hydroxyphenyl)ethyl]benzene, and 1-[1-(3-methyl-4-hydroxyphenyl)isopropyl]-4-[1,1-bis(3-methyl-4-hydroxyphenyl)ethyl]benzene.

(3) (hydroxyphenyl)hydrocarbon compounds, for example, but not limited to, a (hydroxyphenyl)hydrocarbon compound represented by Formula (VI):

$$(VI)$$

wherein $R^v$ and $R^z$ represent, respectively and independently, a hydrogen atom or a $C_1$-$C_6$ alkyl group; and x' and y' denote, respectively and independently, an integer ranging from 1 to 3.

Examples of the (hydroxyphenyl)hydrocarbon compound represented by Formula (VI) include, but are not limited to, 2-(2,3,4-trihydroxyphenyl)-2-(2',3',4'-trihydroxyphenyl)propane, 2-(2,4-dihydroxyphenyl)-2-(2',4'-dihydroxyphenyl)propane, 2-(4-hydroxyphenyl)-2-(4'-hydroxyphenyl)propane, bis(2,3,4-trihydroxyphenyl)methane, and bis(2,4-dihydroxyphenyl)methane.

(4) other aromatic hydroxyl compounds, for example, but not limited to, phenol, p-methoxyphenol, dimethylphenol, hydroquinone, bisphenol A, naphthol, pyrocatechol, pyrogallol monomethyl ether, pyrogallol-1,3-dimethyl ether, gallic acid, and partially esterified or partially etherified gallic acid.

The preferred examples of the hydroxyl compounds include 2,3,4-trihydroxybenzophenone, 1-[1-(4-hydroxyphenyl)isopropyl]-4-[1,1-bis(4-hydroxyphenyl)ethyl]benzene and 2,3,4,4'-tetrahydroxybenzophenone. The aforesaid examples of the hydroxyl compounds can be used alone or as a mixture of two or more.

The reaction of o-naphthoquinonediazidesulfonic acid or salt thereof with the hydroxyl compound is often conducted in an organic solvent such as dioxane, N-pyrrolidone, acetamide, or the like, in the presence of an alkali condensation agent such as triethanolamine, alkali carbonate, alkali hydrogen carbonate, or the like.

Preferably, the esterification rate of the quinonediazidesulfonic acid ester (B) is more than 50%. That is, more than 50% by mole of the hydroxyl group contained in the hydroxyl compound undergoes an esterification reaction with o-naphthoquinonediazidesulfonic acid or salt thereof, based on 100% by mole of the total hydroxyl group contained in the hydroxyl compound. More preferably, the esterification rate of the quinonediazide sulfonate compound is more than 60%.

The quinonediazidesulfonic acid ester (B) is used in an amount ranging from 0.5 to 80 parts by weight, preferably from 1 to 50 parts by weight, and more preferably from 2 to 30 parts by weight, based on 100 parts by weight of polysiloxane (A).

Methylene Alkoxyaryl-containing Compound (C):

The methylene alkoxyaryl-containing compound (C) includes at least one aryl group, at least one methylene alkoxy group, and further at least one hydroxyl group, and serves as a bridge between the polysiloxane (A) which contains siloxane groups and the quinonediazidesulfonic acid ester (B) which contains at least one phenyl group so as to promote the compatibility between the polysiloxane (A) and the quinonediazidesulfonic acid ester (B). Therefore, the photo-curing polysiloxane composition has better sensitivity and curing rate.

The methylene alkoxyaryl-containing compound (C) is selected from a compound of Formula (I):

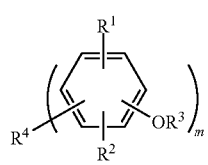

(I)

wherein
m is an integer ranging from 1 to 4;
$R^1$ and $R^2$ are independently selected from the group consisting of a $C_1$-$C_6$ alkyl group and a group of —$CH_2$—O—X with the proviso that at least one of $R^1$ and $R^2$ is the group of —$CH_2$—O—X, and X represents a $C_1$-$C_6$ alkyl group;
$R^3$ is selected from the group consisting of hydrogen, methyl, and ethyl;
$R^4$ is selected from the group consisting of a single bond and a group having m valence with the proviso that
$R^4$ is selected from the group consisting of a $C_1$-$C_6$ alkyl group, a $C_6$-$C_{12}$ cycloalkyl group, and hydrogen when m is 1, $R^4$ represents a bivalent group selected from the group consisting of phenylene, —$SO_2$—,

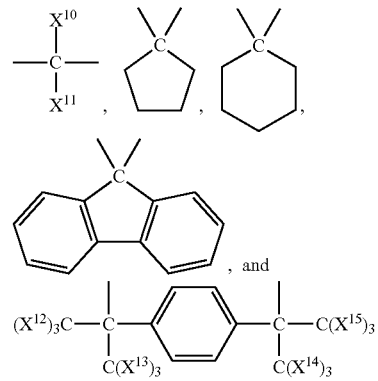

, and when m is 2,
$R^4$ represents a trivalent group selected from the group consisting of

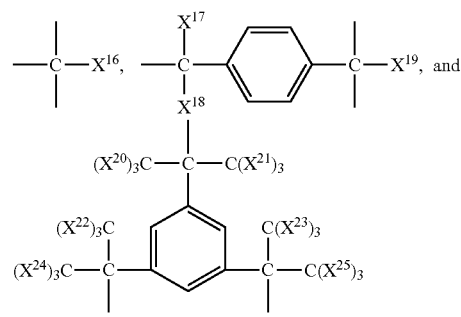

when m is 3, and
$R^4$ represents a tetravalent group selected from the group consisting of

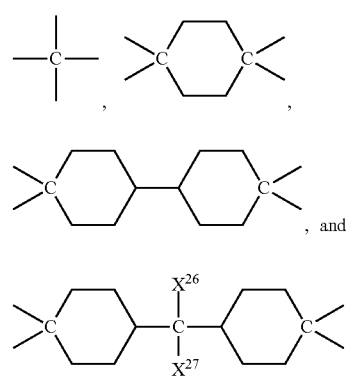

when m is 4,
wherein
$X^{10}$-$X^{27}$ are independently selected from the group consisting of hydrogen, halogen, and a $C_1$-$C_{20}$ organic group;

a compound of Formula (II):

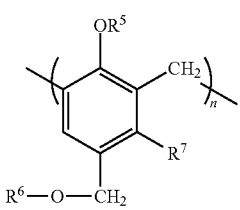
(II)

wherein n is an integer ranging from 10 to 35, $R^5$ and $R^7$ are independently selected from the group consisting of hydrogen, methyl, and ethyl, and $R^6$ represents a $C^1$-$C^6$ alkyl group; and a combination thereof.

Preferably, $R^3$ in Formula (I) denotes a hydrogen atom.

Preferably, X in Formula (I) denotes a $C_1$-$C_3$ alkyl group.

Preferably, $R^4$ in Formula (I) denotes a single bond, a hydrogen atom, —$CH_3$, t-butyl, —$CH_2$—, —$C(CF_3)_2$—, —$C(CH_3)_2$—,

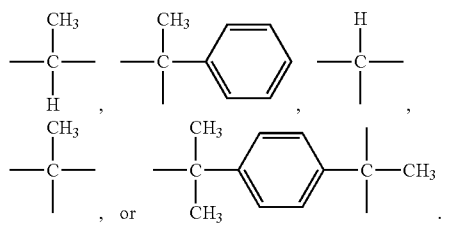

Examples of the compound of Formula (I) can be used alone or as a mixture of two or more, and include, but are not limited to, 2,6-dimethoxymethyl-4-t-butylphenol,
2,6-dimethoxymethyl-p-cresol,

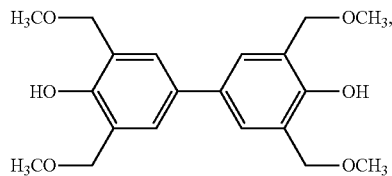
(I-1)

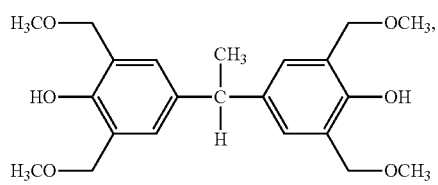
(I-2)

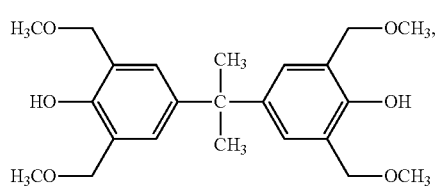
(I-3)

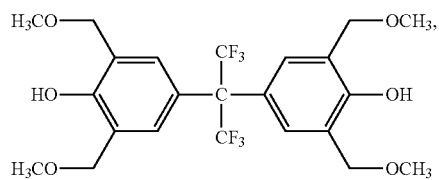
(I-4)

1,1,1-tris [3,5-methoxymethylene-4-hydroxyphenyl] methane with the structure of

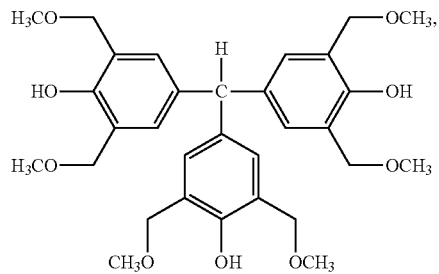
(I-5)

1,1,1-tris [3,5-methoxymethylene-4-hydroxyphenyl] ethane with the structure

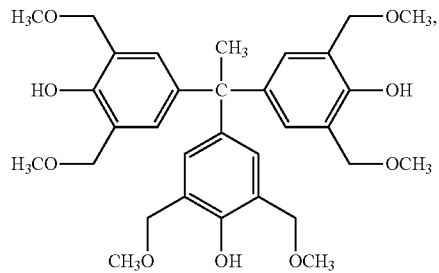
(I-6)

1,1,1-tris [3,5-ethoxymethylene-4-hydroxyphenyl] ethane with the structure

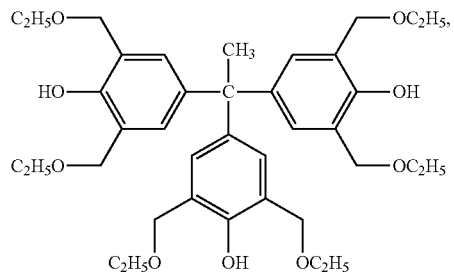
(I-7)

1,1,1-tris [propoxylmethylene-4-hydroxyphenyl] ethane with the structures

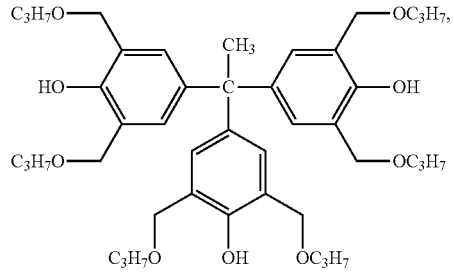
(I-8)

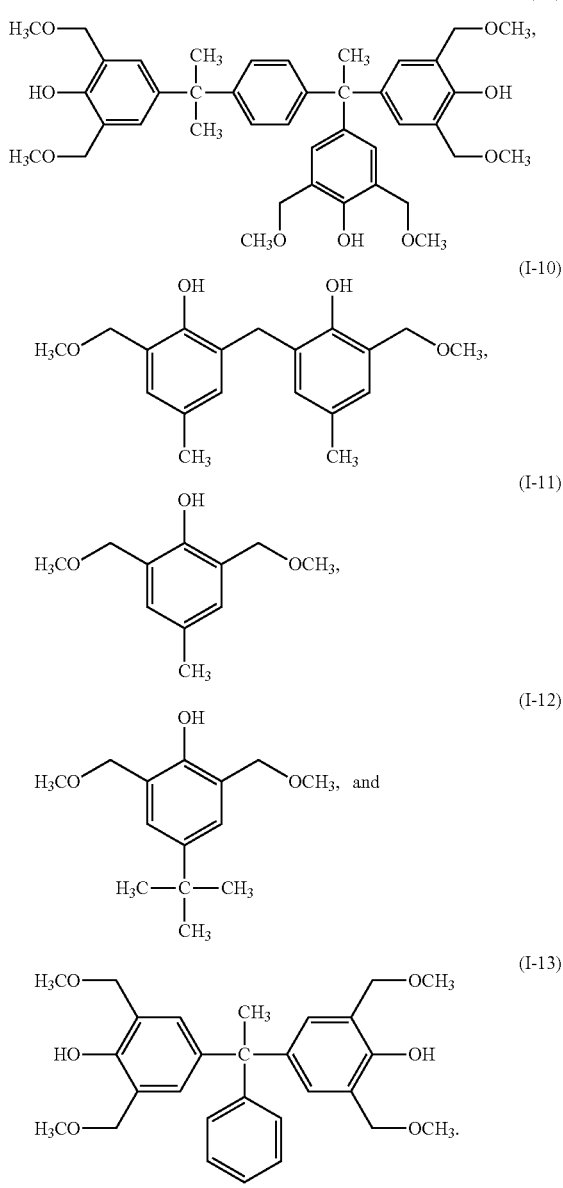

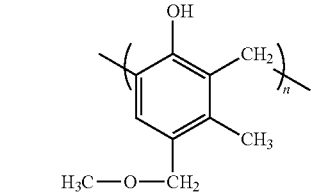

(molecular weight: 1500 to 5500) (II-1).

Examples of the commercially available products of the compound of Formula (II) include C-347 and C-348 manufactured by Gun Ei Chemical Industry Co., Ltd.

The methylene alkoxyaryl-containing compound (C) is used in an amount ranging from 3 to 35 parts by weight, preferably from 5 to 30 parts by weight, and more preferably from 5 to 25 parts by weight, based on 100 parts by weight of the polysiloxane (A).

Solvent (D):

There is no specific limitation to the solvent (D) suitable for use in the photo-curing polysiloxane composition of the present invention. Preferable examples of the solvent include an alcoholic hydroxyl-containing compound, a carbonyl-containing cyclic compound, and a combination thereof.

Examples of the alcoholic hydroxyl-containing compound include, but are not limited to, acetol, 3-hydroxy-3-methyl-2-butanone, 4-hydroxy-3-methyl-2-butanone, 5-hydroxy-2-pentanone, 4-hydroxy-4-methyl-2-pentanone (diacetone alcohol, DAA), ethyl lactate, butyl lactate, propylene glycol monomethyl ether, propylene glycol monoethyl ether (PGEE), propylene glycol mono-n-propyl ether, propylene glycol mono-n-butyl ether, propylene glycol mono-t-butyl ether, 3-methoxy-1-butanol, 3-methyl-3-methoxy-1-butanol, and combinations thereof. Among them, diacetone alcohol, ethyl lactate, and propylene glycol monoethyl ether are preferable. The aforesaid examples of the alcoholic hydroxyl-containing compound can be used alone or as a mixture of two or more.

Examples of the carbonyl-containing cyclic compound include, but are not limited to, γ-butyrolactone, γ-valerolactone, δ-valerolactone, propylene carbonate, N-methylpyrrolidone, cyclohexanone, cycloheptanone, and combinations thereof. Among them, γ-butyrolactone, N-methylpyrrolidone, and cyclohexanone are preferable. The aforesaid examples of the carbonyl-containing cyclic compound can be used alone or as a mixture of two or more.

When the alcoholic hydroxyl-containing compound and the carbonyl-containing cyclic compound are used in combination, there is no specific limitation to the weight ratio thereof. The weight ratio of the alcoholic hydroxyl-containing compound to the carbonyl-containing cyclic compound ranges preferably from 99/1 to 50/50, and more preferably from 95/5 to 60/40. It should be noted that, when the weight ratio of the alcoholic hydroxyl-containing compound to the carbonyl-containing cyclic compound ranges from 99/1 to 50/50, it is less likely for the unreactive silanol group in polysiloxane to undergo condensation reaction that may reduce the storage stability. Moreover, the miscibility between the polysiloxane and the o-naphthoquinonediazidesulfonate is good, so that it is less likely to cloud the protective film, thereby maintaining the transparency of the protective film.

Further solvents other than the aforesaid solvent can be included in the photo-curing polysiloxane composition of the present invention as long as the desirable effects obtainable by the photo-curing polysiloxane composition are not Examples of commercially available products of the compound of Formula (I) include, but are not limited to, the products manufactured by Honshu Chemical Industry Co., Ltd., for example, TMOM-BP (of Formula (I-1)), TMOM-BPE (of Formula (I-2)), TMOM-BPA (of Formula (I-3)), TMOM-BPAF (of Formula (I-4)), HMOM-TPPHBA (of Formula (I-5)), HMOM-TPHAP (of Formula (I-6)), HMOM-TPPA (of Formula (I-9)), DMOM-MBPC (of Formula (I-10)), DMOM-PC (of Formula (I-11)), DMOM-PTBP (of Formula (I-12)), TMOM-BPAP (of Formula (I-13)), or the like; and the products manufactured by Gun Ei Chemical Industry Co., Ltd., for example, C-357 (of Formula (I-9)), C-358 (of Formula (I-6)) or the like.

Preferably, $R^5$ in Formula (II) denotes a hydrogen atom.

Preferably, $R^6$ in Formula (II) denotes a methyl group.

Examples of the compound of Formula (II) can be used alone or as a mixture of two or more, and a non-limiting example thereof is impaired. Examples of the further solvents include, but are not limited to: (1) esters, for example, ethyl acetate, n-propyl acetate, isopropyl acetate, n-butyl acetate, isobutyl acetate, propylene glycol monomethyl ether acetate (PGMEA), 3-methoxy-1-butyl acetate, 3-methyl-3-methoxy-1-butyl acetate, or the like; (2) ketones, for example, methyl isobutyl ketone, diisopropyl ketone, diisobutyl ketone, or the like; (3) ethers, for example, diethyl ether, diisopropyl ether, di-n-butyl ether, diphenyl ether, or the like.

There is no specific limitation to the amount of the solvent (D) used in the photo-curing polysiloxane composition. The solvent (D) is used in an amount ranging generally from 50 to 1,200 parts by weight, preferably from 80 to 1,000 parts by weight, and more preferably from 100 to 800 parts by weight, based on 100 parts by weight of polysiloxane (A).

Additives (E):

Additives (E) commonly used in the art can be optionally added to the photo-curing polysiloxane composition of the present invention, and include, but are not limited to, a sensitizer, a thermal acid generator, an adhesion auxiliary agent, a surfactant, a solubility promoter, a defoamer, and combinations thereof.

There is no specific limitation to the sensitizer. Preferably, the sensitizer is a phenolic hydroxyl-containing compound, for example, but not limited to: (1) trisphenol type compounds, for example, tri(4-hydroxyphenyl)methane, bis(4-hydroxy-3-methylphenyl)-2-hydroxyphenylmethane, bis(4-hydroxy-2,3,5-trimethylphenyl)-2-hydroxyphenylmethane, bis(4-hydroxy-3,5-dimethylphenyl)-4-hydroxyphenylmethane, bis(4-hydroxy-3,5-dimethylphenyl)-3-hydroxyphenylmethane, bis(4-hydroxy-3,5-methylphenyl)-2-hydroxyphenylmethane, bis(4-hydroxy-2,5-dimethylphenyl)-4-hydroxyphenylmethane, bis(4-hydroxy-2,5-dimethylphenyl)-3-hydroxyphenylmethane, bis(4-hydroxy-2,5-dimethylphenyl)-2-hydroxyphenylmethane, bis(4-hydroxy-3,5-dimethylphenyl)-3,4-dihydroxyphenylmethane, bis(4-hydroxy-2,5-dimethylphenyl)-3,4-dihydroxyphenylmethane, bis(4-hydroxy-2,5-dimethylphenyl)-2,4-dihydroxyphenylmethane, bis(4-hydroxyphenyl)-3-methoxy-4-hydroxyphenylmethane, bis(5-cyclohexyl-4-hydroxy-2-methylphenyl)-4-hydroxyphenylmethane, bis(5-cyclohexyl-4-hydroxy-2-methylphenyl)-3-hydroxyphenylmethane, bis(5-cyclohexyl-4-hydroxy-2-methylphenyl)-2-hydroxyphenylmethane, bis(5-cyclohexyl-4-hydroxy-2-methylphenyl)-3,4-dihydroxyphenylmethane, or the like; (2) bisphenol type compounds, for example, bis(2,3,4-trihydroxyphenyl)methane, bis(2,4-dihydroxyphenyl)methane, 2,3,4-trihydroxyphenyl-4'-hydroxyphenylmethane, 2-(2,3,4-trihydroxyphenyl)-2-(2',3',4'-trihydroxyphenyl)propane, 2-(2,4-dihydroxyphenyl)-2-(2',4'-dihydroxyphenyl) propane , 2-(4 hydroxyphenyl) -2-(4'-hydroxyphenyl)propane, 2- (3-fluoro-4-hydroxyphenyl)-2-(3'-fluoro-4'-hydroxyphenyl)propane, 2-(2,4-dihydroxyphenyl)-2-(4'-hydroxyphenyl)propane, 2-(2,3,4-trihydroxyphenyl)-2-(4'-hydroxyphenyl)propane, 2-(2,3,4-trihydroxyphenyl)-2-(4'-hydroxy-3',5'-dimethylphenyl)propane, or the like; (3) polynuclear branched compounds, for example, 1-[1-(4-hydroxyphenyl)-isopropyl]-4-[1,1-bis(4-hydroxyphenyl)ethyl]benzene, 1-[1-(3-methyl-4-hydroxyphenyl]isopropyl]-4-[1,1-bis(3-methyl-4-hydroxyphenyl)ethyl]benzene, or the like; (4) condensation type phenol compounds, for example, 1,1-bis(4-hydroxyphenyl)cyclohexane, or the like; (5) polyhydroxy benzophenones, for example, 2,3,4-trihydroxybenzophenone, 2,4,4'-trihydroxybenzophenone, 2,4,6-trihydroxybenzophenone, 2,3,4-trihydroxy-2'-methylbenzophenone, 2,3,4,4'-tetrahydroxybenzophenone, 2,4,2',4'-tetrahydroxybenzophenone, 2,4,6,3',4'-pentahydroxybenzophenone, 2,3,4,2',4'-pentahydroxybenzophenone, 2,3,4,2',5'-pentahydroxybenzophenone, 2,4,6,3',4',5'-hexahydroxybenzophenone, 2,3,4,3',4',5'-hexahydroxybenzophenone, or the like; or combinations thereof.

The sensitizer is used in an amount ranging preferably from 5 to 50 parts by weight, more preferably from 8 to 40 parts by weight, and most preferably from 10 to 35 parts by weight, based on 100 parts by weight of polysiloxane (A).

Examples of the thermal acid generator include, but are not limited to, 4-hydroxyphenyldimethylsulfonium, benzyl-4-hydroxyphenylmethylsulfonium, 2- methylbenzyl-4-hydroxyphenylmethylsulfonium, 2-methylbenzyl-4-acetylphenylmethylsulfonium, 2 -methylbenzyl-4-benzoyloxyphenylmethylsulfonium, and methanesulfonates, trifluoromethanesulfonates, camphorsulfonates, p-toluenesulfonates, or the likes thereof, commercially available products manufactured by Sanshin Chemical Industry Co. Ltd. (for example, SI-60, SI-80, SI-100, SI-110, SI-145, SI-150, SI-60L, SI-80L, SI-100L, SI-110L, SI-145L, SI-150L, SI-160L, SI-180L), and combinations thereof. Among them, 4-hydroxyphenyldimethylsulfonium, benzyl -4-hydroxyphenylmethylsulfonium, 2-methylbenzyl-4-hydroxyphenylmethylsulfonium, 2-methylbenzyl-4-acetylphenylmethylsulfonium, 2-methylbenzyl-4-benzoyloxyphenylmethylsulfonium, and methanesulfonates, trifluoromethanesulflates, camphorsulfonates and p-toluenesulfonates thereof are preferred. The aforesaid Examples of the thermal acid generator can be used alone or as a mixture of two or more.

The thermal acid generator is used in an amount ranging preferably from 0.01 to 10 parts by weight, more preferably from 0.03 to 8 parts by weight, and most preferably from 0.05 to 5 parts by weight, based on 100 parts by weight of polysiloxane (A).

The adhesion auxiliary agent is used to enhance the adhesion of the photo-curing polysiloxane composition of the present invention to a substrate containing a semiconductor material. Examples of the adhesion auxiliary agent include, but are not limited to, melamine compounds and silane compounds. Examples of the commercially available products of the melamine compounds include, but are not limited to, Cymel-300, Cymel-303, or the like manufactured by Mitsui Chemical; and MW-30MH, MW-30, MS-11, MS-001, MX-750, MX-706, or the like manufactured by Sanwa Chemical. Examples of the silane compounds include, but are not limited to, vinyltrimethoxysilane, vinyitriethoxysilane, 3-acryloxypropyltrimethoxy silane, vinyltri(2-methoxyethoxy)silane, N-(2-amino-ethyl)-3-aminopropylmethyldimethoxysilane, N-(2-amino-ethyl)-3-aminopropyltrimethoxysilane, 3-aminopropyltriethoxysilane, 3-glycidoxypropyitrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane, 3-mercaptopropyltrimethoxysilane, and commercially available products manufactured by Shin-Etsu Chemical Co., Ltd. (for example, KMB403).

The melamine compounds used as the adhesion auxiliary agent are in an amount ranging preferably from 0 to 20 parts by weight, more preferably from 0.5 to 18 parts by weight, and most preferably from 1.0 to 15 parts by weight, based on 100 parts by weight of polysiloxane (A).

The silane compounds used as the adhesion auxiliary agent are in an amount ranging preferably from 0 to 2 parts by weight, more preferably from 0.05 to 1 parts by weight, and most preferably from 0.1 to 0.8 parts by weight, based on 100 parts by weight of polysiloxane (A).

Examples of the surfactant include, but are not limited to, anionic surfactant, cationic surfactant, nonionic surfactant, amphoteric surfactant, polysiloxane surfactant, fluorinated surfactant, and combinations thereof. Examples of the surfactant include, but are not limited to: (1) polyoxyethylene alkyl ethers, for example, polyoxyethylene lauryl ether, or the like; (2) polyoxyethylene alkyl phenyl ethers, for example, polyoxyethylene octyl phenyl ether, polyoxyethylene nonyl phenyl ether, or the like; (3) polyethylene glycol diesters, for example, polyethylene glycol dilaurate, polyethylene glycol distearate, or the like; (4) sorbitan fatty acid esters; (5) fatty acid modified polyesters; and (6) tertiary amine modified polyurethanes. Examples of commercially available products of the surfactant include KP (manufacture by Shin-Etsu Chemical Co., Ltd.), SF-8427 (manufactured by Toray Dow Corning Silicone), Polyflow (manufactured by Kyoeisha Chemical Co., Ltd.), F-Top (manufactured by Tochem Product Co., Ltd.), Megaface (manufactured by DIC , Fluorade (manufactured by Sumitomo 3M), Surflon (manufactured by Asahi Glass), SINOPOL E8008 (manufactured by Sino-Japan Chemical Co., Ltd.), F-475 (manufactured by DIC), and combinations thereof.

The surfactant is used in an amount ranging from 0.5 to 50 parts by weight, preferably from 1 to 40 parts by weight, more preferably from 3 to 30 parts by weight, based on 100 parts by weight of polysiloxane (A).

Examples of the defoamer include, but are not limited to, Surfynol MD-20, Surfynol MD-30, EnviroGem AD01, EnviroGem AE01, EnviroGem AE02, Surfynol DF 110D, Surfynol 104E, Surfynol 420, Surfynol DF 37, Surfynol DF 58, Surfynol DF 66, Surfynol DF 70, and Surfynol DF 210 (manufactured by Air products).

The defoamer is used in an amount ranging preferably from 1 to 10 parts by weight, more preferably from 2 to 9 parts by weight, and most preferably from 3 to 8 parts by weight, based on 100 parts by weight of polysiloxane (A).

Examples of the solubility promoter include, but are not limited to, N-hydroxydicarboxylicimide, and phenolic hydroxyl compounds, for example, the hydroxyl compounds used for manufacturing the quinonediazidesulfonic acid ester.

The solubility promoter is used in an amount ranging preferably from 1 to 20 parts by weight, more preferably from 2 to 15 parts by weight, and most preferably from 3 to 10 parts by weight, based on 100 parts by weight of polysiloxane (A).

The photo-curing polysiloxane composition of the present invention is manufactured by stirring the polysiloxane (A), the quinonediazidesulfonic acid ester (B), the methylene alkoxyaryl-containing compound (C) and the solvent (D) optionally together with the additives (E), such as the sensitizer, the thermal acid generator, the adhesion auxiliary agent, the surfactant, the defoamer, and the solubility promoter in a stirrer.

A protective film of the present invention is formed by coating the photo-curing polysiloxane composition onto a substrate followed by pre-bake, exposure, development, and post-bake treatments.

The photo-curing polysiloxane composition is applied on the substrate by spin coating, slit coating, roller coating, or the like, and is then prebaked to remove the solvent and to form a prebaked coating film. The conditions for the prebaking depend on the types and the formulating ratio of the components for the photo-curing polysiloxane composition. However, the prebaking is usually conducted at a temperature ranging from 70° C. to 110° C. for a period ranging from 1 to 15 minutes. The prebaked coating film is exposed via a photomask using ultraviolet light, such as g-line, h-line, i-line, or the like. The device for providing the ultraviolet light includes a (ultra-) high pressure mercury lamp, and a metal halide lamp. The prebaked coating film after exposing is immersed in a developer solution at a temperature of 23±2° C. for a period ranging from 15 seconds to 5 minutes so as to form a desired pattern. Examples of the developer include alkali compounds, such as sodium hydroxide, potassium hydroxide, sodium carbonate, sodium hydrogen carbonate, potassium carbonate, potassium hydrogen carbonate, sodium silicate, sodium methylsilicate, aqueous ammonia, ethylamine, diethylamine, dimethyl ethanolamine, tetramethylammonium hydroxide, tetraethylammonium hydroxide, choline, pyrrole, piperidine, 1,8-diazabicyclo-[5,4,0]-7-undecene, or the like.

The developer solution is used to reveal defined patterns after exposing the photo-curing polysiloxane composition. If the concentration of the developer solution is too high, the specific pasterns will be damaged or have deteriorated resolution. If the concentration of the developer solution is too low, the specific patterns will not be formed due to poor development or have residuals after development. The concentration of the developer solution will influence the patterns formed by the photo-curing polysiloxane composition after exposure. Preferably, the developer solution is used in a concentration ranging preferably from 0.001 to 10 wt %, more preferably from 0.005 to 5 wt %, and most preferably from 0.01 to 1 wt %.

In the illustrative examples of this invention, 2.38 wt % of tetramethylammonium hydroxide was used as the developer solution. The developer solution of 2.38 wt % is commonly used in the art while the developer solution less than 2.38 wt % can be used, if required. The developer solution of 2.38% can be used for developing the photo-curing polysiloxane composition in this invention. The photo-curing polysiloxane composition is capable of forming fine patterns even when a developer solution less than 2.38 wt % is used.

The developer solution is removed by washing with water after development. The coating film formed on the substrate is dried with compressed air or nitrogen, and is then post-baked using a heating device, such as a hot plate or an oven. The post-baking is conducted at a temperature ranging from 100 to 250° C. for a period ranging from 1 to 60 minutes if the hot plate is used or for a period ranging from 5 to 90 minutes if the oven is used. A protective film is formed on the substrate after conducting the aforementioned process.

Examples of the substrate suitable for the present invention include alkali-free glass, soda-lime glass, Pyrex glass, quartz glass, a glass coated with a transparent conductive film thereon, and the like commonly used in a liquid crystal display; and a photoelectric conversion substrate (for example, a silicon substrate) used in a solid-state image sensor.

An element including the substrate and the protective film formed from the photo-curing polysiloxane composition of the present invention and applied on the substrate can be used in a display device, a semiconductor device, an optical waveguide device, or the like.

The following examples are provided to illustrate the preferred embodiments of the invention, and should not be construed as limiting the scope of the invention.

EXAMPLES

Preparation of Polysiloxane (A)

Preparation Example A-1

A 500 ml three-necked flask was added with methyltrimethoxysilane (referred to as MTMS, 102.0 g, 0.75 mole), phenyltrimethoxysilane (referred to as PTMS, 49.5 g, 0.25 mole), and propylene glycol monoethyl ether (referred to as PGEE, 200 g). Stirring was conducted at room temperature while an oxalic acid aqueous solution (0.40 g oxalic acid/75 g H₂O) was added over 30 minutes. The mixture in the flask was then stirred in an oil bath at a temperature of 30° C. for 30 minutes. The temperature of the oil bath was raised to 120° C. within a succeeding 30 minutes. When the temperature of the mixture in the flask reached 105° C., the mixture in the flask was stirred for a further 6 hours to carry out polycondensation reaction. After the solution reached room temperature, 1500 g of (1-methylethyl)benzene was added with continuous stirring for 30 minutes. Precipitate was obtained by filtration followed by removal of solvent using distillation. Subsequently, 2000 g of acetone was added with 30 minutes continuous stirring. Refined polysiloxane (A-1) was obtained after filtration followed by distillation.

Preparation Example A-2

A 500 ml three-necked flask was added with dimethyldimethoxysilane (referred to as DMDMS, 84 g, 0.7 mole), PTMS (29.7 g, 0.15 mole), phenyltriethoxysilane (referred to as PTES, 28.8 g, 0.12 mole), GF-20 (9.2 g, 0.03 mole), PGEE (100 g), and diacetone alcohol (referred to as DAA, 100 g). Stirring was conducted at room temperature while an oxalic acid aqueous solution (0.40 g oxalic acid/75 g H₂O) was added over 30 minutes. The mixture in the flask was then stirred in an oil bath at a temperature of 30° C. for 30 minutes. The temperature of the oil bath was raised to 120° C. within a succeeding 30 minutes. When the temperature of the mixture in the flask reached 110° C., the mixture in the flask was stirred for a further 5 hours to carry out polycondensation reaction. After the solution reached room temperature, 1500 g of acetone was added with continuous stirring for 30 minutes. Precipitate was obtained by filtration followed by removal of solvent using distillation to obtain refined polysiloxane. The polysiloxane was then dissolved in 200 g of propylene glycol monoethyl ether with continuous stirring at room temperature to form a homogeneous solution. Subsequently, 1500 g of acetone was added with 30 minutes continuous stirring. Refined polysiloxane (A-2) was obtained after filtration followed by distillation.

Preparation Example A-3

A 500 ml three-necked flask was added with DMDMS (84 g, 0.7 mole), PTMS (45.5 g, 0.23 mole), 3-(trimethoxysilyl) propyl glutaric anhydride (referred to as TMSG, 19.3 g, 0.07 mole), and PGEE (200 g). Stirring was conducted at room temperature while an oxalic acid aqueous solution (0.35 g oxalic acid/75 g H₂O) was added over 30 minutes. The mixture in the flask was then stirred in an oil bath at a temperature of 30° C. for 30 minutes. The temperature of the oil bath was raised to 120° C. within a succeeding 30 minutes. When the temperature of the mixture in the flask reached 105° C., the mixture in the flask was stirred for a further 6 hours to carry out polycondensation reaction. After the solution reached room temperature, 1500 g of acetone was added with continuous stirring for 30 minutes. Precipitate was obtained by filtration followed by removal of solvent using distillation to obtain refined polysiloxane. The polysiloxane was then dissolved in 200 g of propylene glycol monoethyl ether with continuous stirring at room temperature to form a homogeneous solution. Subsequently, 1500 g of (1-methylethyl)benzene was added with 30 minutes continuous stirring. Refined polysiloxane (A-3) was obtained after filtration followed by distillation.

Preparation Example A-4

A 500 ml three-necked flask was added with MTMS (102.0 g, 0.75 mole), PTES (36.0 g, 0.15 mole), TMSOX-D (25.1 g, 0.09 mole), DMS-S27 (180 g, 0.01 mole), and PGEE (200 g). Stirring was conducted at room temperature while an oxalic acid aqueous solution (0.45 g oxalic acid/75 g H₂O) was added over 30 minutes. The mixture in the flask was then stirred in an oil bath at a temperature of 30° C. for 30 minutes. The temperature of the oil bath was raised to 120° C. within a succeeding 30 minutes. When the temperature of the mixture in the flask reached 110° C., the mixture in the flask was stirred for a further 6 hours to carry out polycondensation reaction. After the solution reached room temperature, 1500 g of acetone was added with continuous stirring for 30 minutes. Refined polysiloxane (A-4) was obtained after filtration followed by distillation.

The amounts of the silane monomers, the siloxane prepolymers, the solvents, and the catalysts, and the reaction conditions used in the preparation examples are summarized in Table 1.

TABLE 1

| Prep. Ex. | silane monomers/Siloxane Prepolymers (moles) | | | | | | | | Solvents (g) | | Catalysts (g) | | Reaction Temp. (° C.) | Polycondensation Time (hrs) |
|---|---|---|---|---|---|---|---|---|---|---|---|---|---|---|
| | MTMS | DMDMS | PTMS | PTES | GF-20 | TMSG | TMSOX-D | DMS-S27 | PGEE | DAA | Water | Oxalic acid | | |
| A-1 | 0.75 | — | 0.25 | — | — | — | — | — | 200 | — | 75 | 0.40 | 105 | 6 |
| A-2 | — | 0.70 | 0.15 | 0.12 | 0.03 | — | — | — | 100 | 100 | 75 | 0.40 | 110 | 5 |
| A-3 | — | 0.70 | 0.23 | — | — | 0.07 | — | — | 200 | — | 75 | 0.35 | 105 | 6 |
| A-4 | 0.75 | — | — | 0.15 | — | — | 0.09 | 0.01 | 200 | — | 75 | 0.45 | 110 | 6 |

MTMS: methyltrimethoxysilane;
DMDMS: dimethyldimethoxysilane;
PTMS: phenyltrimethoxysilane;
PTES: phenyltriethoxysilane;
GF-20: 3-(triethoxysilyl)propyl succinic anhydride;
TMSG: 3-(trimethoxysilyl)propyl glutaric anhydride;
TMSOX-D: 3-ethyl-3-[[3-(trimethoxysilyl)propoxy]methyl]oxetane;
DMS-S27: silanol terminal polysiloxanes manufactured by Gelest Inc.
PGEE: propylene glycol monoethyl ether
DAA: diacetone alcohol Preparation of Photo-curing Polysiloxane Composition Example 1

100 parts by weight of the polysiloxane (A-1) obtained in Preparation Example 1, 2 parts by weight of an o-naphthoquinonediazidesulfonate compound (DPAP200 manufactured by DKC, average esterification rate: 67%) obtained by reacting 1-[1-(4-hydroxyphenyl)isopropyl]-4-[1,1-bis(4-hydroxyphenyl)ethyl]benzene with o-naphthoquinonediazo-5-sulfonic acid, and 3 parts by weight of HMOM-TPPHBA were added into 50 parts by weight of diacetone alcohol. Stirring was conducted using a shaking type stirrer until a homogenous photo-curing polysiloxane composition was obtained. The obtained photo-curing polysiloxane composition was evaluated according to the following evaluation methods. The evaluation results are shown in Table 2.

Examples 2 to 9 and Comparative Examples 1 and 2

Examples 2 to 9 and Comparative Examples 1 and 2 were conducted in a manner identical to that of Example 1 using the components and the amounts thereof shown in Table 2. The obtained photo-curing polysiloxane compositions of Examples 2 to 9 and Comparative Examples 1 and 2 were evaluated according to the following evaluation methods. The evaluation results are shown in Table 2.
Evaluation Methods:
1. Sensitivity:
The photo-curing polysiloxane compositions obtained in Examples 1 to 9 and Comparative Examples 1 and 2 were separately spin-coated on glass substrates 100 mm×100 mm×0.7 mm to obtain pre-coated films of 2 μm in thickness followed by pre-baking at 110° C. for 2 minutes. The pre-coated films were then treated with ultra-violet irradiation using an exposure machine (Model No. AG250-4N-D-A-S-H manufactured by M & R Nano Technology Co., Ltd.) through suitable photo-masks in a 30 μm spacing, and were then immersed in a developer solution of 2.38 wt % tetramethylammonium hydroxide solution at 23° C. for 1 minute to dissolve the exposed portions of the pre-coated films followed by washing with pure water. The evaluation was conducted by determining the exposure energy (mJ) required for each exposure area (0.5 cm×0.5 cm) to be fully developed. Lower exposure energy required for each exposure area to be fully developed means better sensitivity.
  ○: exposure energy≤60 mJ;
  Δ: 60 mJ<exposure energy≤100 mJ;
  X: 100 mJ<exposure energy.
2. Curing Rate:
A. Chemical Resistance:
The photo-curing polysiloxane compositions obtained in Examples 1 to 9 and Comparative Examples 1 and 2 were separately spin-coated on glass substrates of 100 mm×100 mm×0.7 mm to obtain pre-coated films of 2 μm in thickness followed by pre-baking at 110° C. for 2 minutes. The pre-coated films were treated with ultra-violet irradiation with energy intensity of 100 mJ/cm$^2$ using an exposure machine through suitable photo-masks, and were then immersed in a developer solution of 2.38 wt % tetramethylammonium hydroxide solution for 60 seconds to dissolve the exposed portions of the pre-coated films followed by washing with pure water. The developed films were directly irradiated by the exposure machine with energy intensity of 200 mJ/cm$^2$. Then post-baking at 230° C. was conducted at distinct periods. The post-baked films were then immersed in TOK106 solution at 60° C. for 6 minutes. Variations of film thickness were calculated through the following formula:

Variation of film thickness=[(film thickness after immersion−film thickness before immersion)/film thickness before immersion]×100%

Preferably, the variation film thinness ranges from −1% to 3%.
Post-bake time is defined as follows:
  ◉: post-bake time≤30 min;
  ○: post-bake time≤60 min;
  X: post-bake time>60 min.
Shorter post-bake time and smaller variation of film thickness mean faster curing rate.
B. Hardness:
The photo-curing polysiloxane compositions obtained in Examples 1 to 9 and Comparative Examples 1 and 2 were separately spin-coated on glass substrates of 100 mm×100 mm×0.7 mm to obtain pre-coated films of 2 μm in thickness followed by pre-baking at 110° C. for 2 minutes. The pre-coated films were treated with ultra-violet irradiation with energy intensity of 100 mJ/cm$^2$ using an exposure machine through suitable photo-masks, and were then immersed in a developer solution of 2.38 wt % tetramethylammonium hydroxide solution for 60 seconds to dissolve the exposed portions of the pre-coated films followed by washing with pure water. The developed films were directly irradiated by the exposure machine with energy intensity of 200 mJ/cm$^2$. Then post-baking at 230° C. was conducted at distinct periods to obtain protective films on the glass substrates. The protective films were tested by pencil hardness tester (Model P-247, manufactured by Mitsubishi). 1 cm scratching was conducted on the protective films in six degrees using 5H pencil with 500 g weight and 0.5 mm/sec rate. When two or more scratch marks appeared on the protective film, it was evaluated as fail.
Post-bake time is defined as follows:
  ◉: post-bake time≤30 min;
  ○: post-bake time≤60 min;
  X: post-bake time>60 min.
Shorter post-bake time with no scratch mark on the protective films mean faster curing rate.

TABLE 2

| Components (parts by weight) | | Examples | | | | | | | | | Comparative Examples | |
|---|---|---|---|---|---|---|---|---|---|---|---|---|
| | | 1 | 2 | 3 | 4 | 5 | 6 | 7 | 8 | 9 | 3 | 4 |
| (A) | A-1 | 100 | — | — | — | 25 | 50 | 75 | — | — | 100 | — |
| | A-2 | — | 100 | — | — | 75 | — | — | 50 | — | — | 100 |
| | A-3 | — | — | 100 | — | — | 50 | — | 50 | 50 | — | — |
| | A-4 | — | — | — | 100 | — | — | 25 | — | 50 | — | — |
| (B) | B-1 | 2 | 10 | 30 | 50 | — | — | — | 10 | 20 | 30 | — |
| | B-2 | — | — | — | — | 20 | 40 | 60 | 10 | 20 | — | 30 |

TABLE 2-continued

| Components (parts by weight) | | | Examples | | | | | | | | | Comparative Examples | |
|---|---|---|---|---|---|---|---|---|---|---|---|---|---|
| | | | 1 | 2 | 3 | 4 | 5 | 6 | 7 | 8 | 9 | 3 | 4 |
| (C) | C-1 | | 3 | — | — | — | — | 5 | 10 | — | — | — | — |
| | C-2 | | — | 10 | — | — | — | 5 | — | 10 | — | — | — |
| | C-3 | | — | — | 20 | — | — | — | 10 | — | 20 | — | — |
| | C-4 | | — | — | — | 30 | — | — | — | 20 | — | — | — |
| | C-5 | | — | — | — | — | 35 | — | — | — | 15 | — | — |
| (D) | D-1 | | 50 | 200 | 500 | 1000 | — | — | — | 100 | — | 500 | — |
| | D-2 | | — | — | — | — | 200 | 500 | — | 100 | 200 | — | 500 |
| | D-3 | | — | — | — | — | — | — | 1000 | — | 200 | — | — |
| (E) | E-1 | | — | — | — | — | 0.1 | — | — | — | 0.2 | — | — |
| | E-2 | | — | — | — | — | — | — | 3 | — | — | — | — |
| Evaluation Items | Sensitivity | | ○ | ○ | ○ | ○ | ○ | ○ | ○ | ○ | ○ | X | Δ |
| | Curing rate | Chemical resistance | ○ | ○ | ○ | ○ | ○ | ○ | ○ | ○ | ○ | X | X |
| | | Hardness | ○ | ○ | ○ | ○ | ◎ | ○ | ○ | ○ | ◎ | X | X |

B-1 o-naphthoquinonediazidesulfonate compound obtained by reacting 1-[1-(4-hydroxyphenyl)isopropyl]-4-[1,1-bis(4-hydroxyphenyl)ethyl]benzene with o-naphthoquinonediazide-5-sulfonic acid;
B-2 an o-naphthoquinonediazidesulfonate compound obtained by reacting 2,3,4-trihydroxybenzophenone with o-naphthoquinonediazide-5-sulfonic acid;
C-1 HMOM-TPPHBA (Formula I-5);
C-2 TMOM-BPAF (Formula I-4);
C-3 C-357 (Formula I-9);
C-4 C-347 (Formula II-1);
C-5 DMOM-PC (Formula I-11);
D-1 diacetone alcohol;
D-2 propylene glycol monoethyl ether;
D-3: cyclohexanone;
E-1: adhesion auxiliary agent KBM403, manufactured by Shin-Etsu Chemical Co., Ltd.;
E-2: surfactant F-475, manufactured by DIC.

As shown in Table 2, the photo-curing polysiloxane compositions in Examples 1 to 9 have better sensitivity and curing rate by using the methylene alkoxyaryl-containing compound (C). The photo-curing polysiloxane compositions in Comparative Examples 1 and 2, without using the methylene alkoxyaryl-containing compound (C), do not have better sensitivity and curing rate.

In view of the aforesaid, the present invention provides a photo-curing polysiloxane composition of good homogeneity by using the methylene alkoxyaryl-containing compound (C) having phenyl group and alkoxy group (or that further includes hydroxyl group) which promotes the component homogeneity of the photo-curing polysiloxane composition. The photo-curing polysiloxane composition has better sensitivity and curing rate during lithography process.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A photo-curing polysiloxane composition, comprising:
a polysiloxane (A);
a quinonediazidesulfonic acid ester (B);
a methylene alkoxyaryl-containing compound (C); and
a solvent (D)
wherein said methylene alkoxyaryl-containing compound (C) is selected from the group consisting of
a compound of Formula (I):

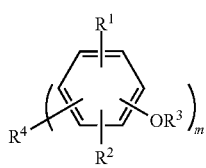

(I)

wherein m is an integer ranging from 1 to 4, $R^1$ and $R^2$ are independently selected from the group consisting of a $C_1$-$C_6$ alkyl group and a group of —$CH_2$—O—X with the proviso that at least one of $R^1$ and $R^2$ is the group of —$CH_2$—O—X, wherein X represents a $C_1$-$C_5$ alkyl group, $R^3$ is selected from the group consisting of hydrogen, methyl, and ethyl, $R^4$ is selected from the group consisting of a single bond and a group having m valence with the proviso that $R^4$ is selected from the group consisting of a $C_1$-$C_6$ alkyl group, a $C_6$-$C_{12}$ cycloalkyl group, and hydrogen when m is 1, $R^4$ is a bivalent group selected from the group consisting of phenylene, —$SO_2$—,

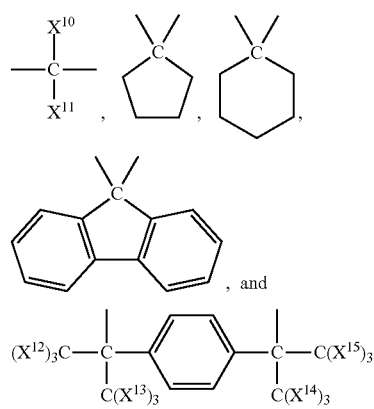

when m is 2, $R^4$ is a trivalent group selected from the group consisting of

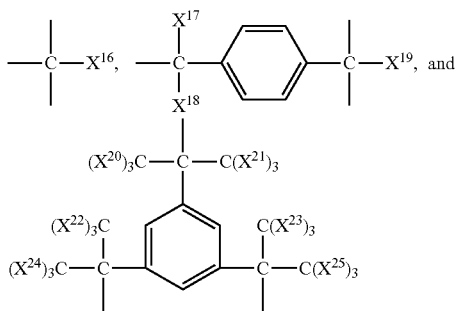

when m is 3, and
$R^4$ is a tetravalent group selected from the group consisting of

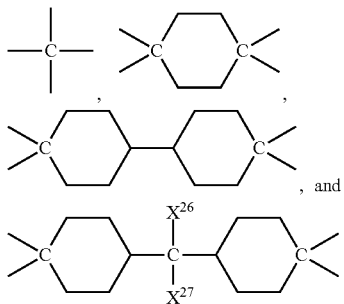

when m is 4,
wherein $X^{10}$-$X^{27}$ are independently selected from the group consisting of hydrogen, halogen, and a $C_1$-$C_{20}$ organic group,
a compound of Formula (II):

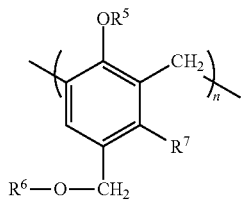

(II)

wherein
n is an integer ranging from 10 to 35,
$R^5$ and $R^7$ are independently selected from the group consisting of hydrogen, methyl, and ethyl, and
$R^6$ represents a $C^1$-$C^6$ alkyl group, and a combination thereof,
wherein said polysiloxane (A) is a copolymer obtained by subjecting a silane monomer of Formula (III) to hydrolysis and partial condensation, $$Si(R^a)_t(OR^b)_{4-t} \quad \text{(III)}$$

wherein
t is an integer ranging from 0 to 3,
$R^a$ is selected from the group consisting of hydrogen, a $C_1$-$C_{10}$ alkyl group, a $C_2$-$C_{10}$ alkenyl group, a $C_6$-$C_{15}$ aryl group, an anhydride-substituted alkyl group, an oxetanyl-substituted alkyl group, an oxetanyl-substituted alkoxy group, a glycidyl-substituted alkyl group, and a glycidyl-substituted alkoxy group, plural $R^a$s being identical with or different from each other when t is 2 or 3, and
$R^b$ is selected from the group consisting of hydrogen, a $C_1$-$C_6$ alkyl group, a $C_1$-$C_6$ acyl group, and a $C_6$-$C_{15}$ aryl group, plural $R^b$s being identical with or different from each other when 4-t is 2 or 3,
with the proviso that said silane monomer of Formula (III) includes at least one silane monomer selected from the group consisting of said silane monomer of Formula (III) having an anhydride group and said silane monomer of Formula (III) having an oxetanyl group.

2. The photo-curing polysiloxane composition as claimed in claim 1, wherein said methylene alkoxyaryl-containing compound is in an amount ranging from 3 to 35 parts by weight based on 100 parts by weight of said polysiloxane.

3. The photo-curing polysiloxane composition as claimed in claim 1, wherein $R^3$ represents hydrogen.

4. The photo-curing polysiloxane composition as claimed in claim 1, wherein X represents a $C_1$-$C_3$ alkyl group.

5. The photo-curing polysiloxane composition as claimed in claim 1, wherein $R^4$ is selected from the group consisting of a single bond, hydrogen, —$CH_3$, t-butyl, —$CH_2$—, —$C(CF_3)_2$—, —$C(CH_3)_2$—,

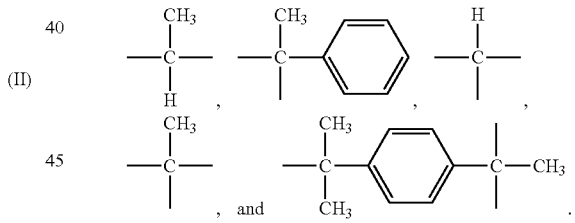

6. A protective film-formed by applying the photo-curing polysiloxane composition as claimed in claim 1 on a substrate followed by prebake, exposure, development, and post-bake treatments.

7. An element, comprising a substrate, and the protective film as claimed in claim 6 applied on said substrate.

* * * * *